United States Patent [19]

Nix

[11] 4,164,707

[45] Aug. 14, 1979

[54] MAGNETIC THICKNESS GAUGE OF THE MAGNET ADHESION TYPE USING DRIVE MEANS WITH A GOVERNOR TO RAISE THE MAGNET

[76] Inventor: Norbert Nix, Robert Perthel Str. 2-4, 5000 Cologne 60, Fed. Rep. of Germany

[21] Appl. No.: 811,842

[22] Filed: Jun. 30, 1977

[30] Foreign Application Priority Data

Jun. 30, 1976 [DE] Fed. Rep. of Germany ....... 2629505
Jun. 30, 1976 [DE] Fed. Rep. of Germany ....... 7620765

[51] Int. Cl.$^2$ ............................................. G01B 7/06
[52] U.S. Cl. .................................................... 324/230
[58] Field of Search ................... 324/34 TK, 229–231

[56] References Cited

U.S. PATENT DOCUMENTS 3,716,779  2/1973  Akulov ........................... 324/34 TK

FOREIGN PATENT DOCUMENTS 1136915 12/1968 United Kingdom ............... 324/34 TK
134882  10/1966 U.S.S.R .............................. 324/34 TK

OTHER PUBLICATIONS

Elektro-Physik Publication; "Surface Testing Instruments", Nix & Steingroeven K.G.; 5 Köln 60; Pasteurstr. 15, West Germany, p. 8; 1970.

Primary Examiner—Robert J. Corcoran
Attorney, Agent, or Firm—Armstrong, Nikaido, Marmelstein & Kubovcik

[57] ABSTRACT

An improvement is provided in a device for measuring the thickness of non-magnetic layers on magnetic substrates by determining the adhesion of a magnet in contact with the layer. The device comprises a housing, a scale balance carrying the magnet at one end thereof, the scale balance being mounted rotatably on an axis, a manually rotatable disk and a first spring means connected to the scale balance at one end and to the scale disk at the other end. The scale disk and first spiral spring are coaxial with the scale balance axis. The improvement comprises drive means including a second spiral spring means which has one end attached to the casing and the other end attached to the scale disk. The second spiral spring is coaxial with the scale balance axis. The spring tension of the second spiral spring means is slightly greater than that of the first spiral spring means and counteracts the first spiral spring means. A governor means controls the rotational speed of the scale disk and a pawl means is formed on the scale balance, the pawl means engaging the drive means, thereby blocking the further rotation of the scale disk upon raising the magnet from the non-magnetic layer.

9 Claims, 4 Drawing Figures

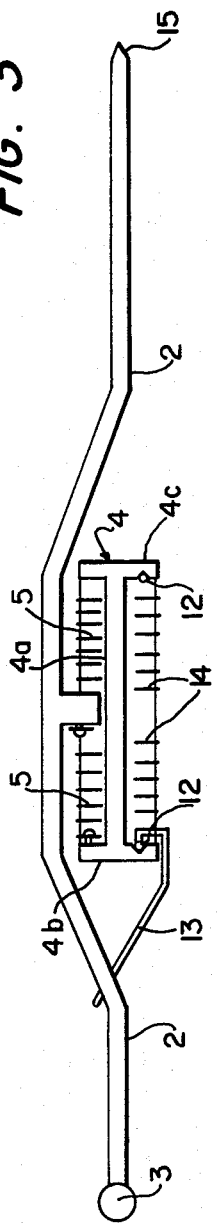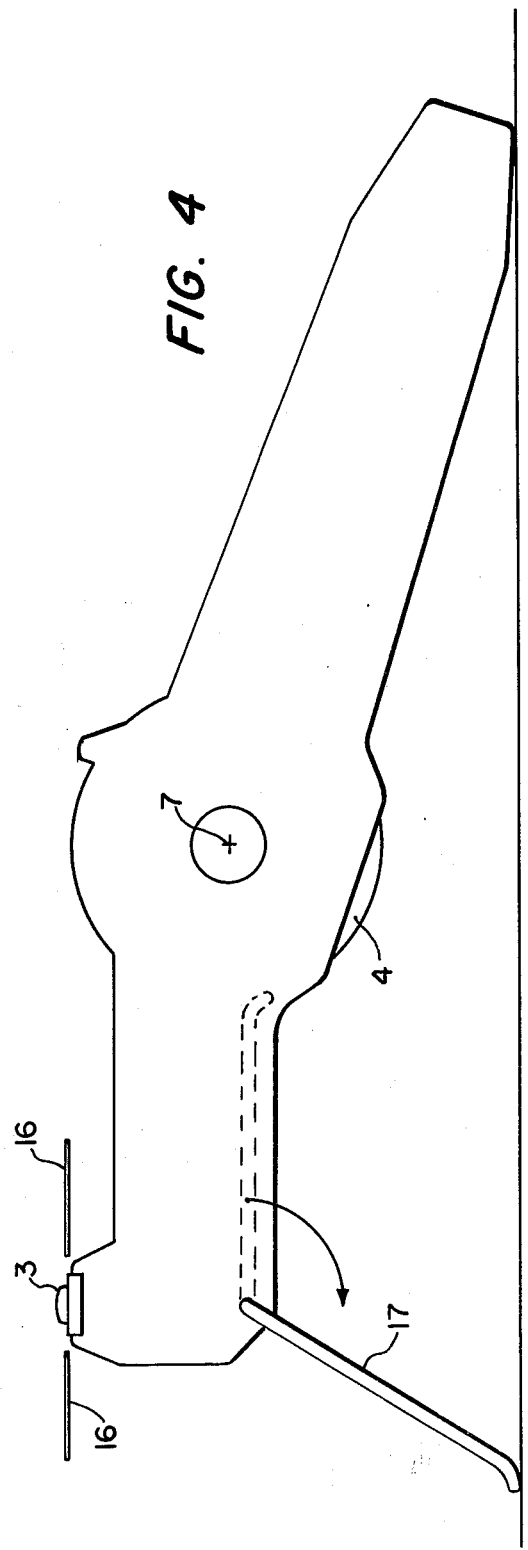

MAGNETIC THICKNESS GAUGE OF THE MAGNET ADHESION TYPE USING DRIVE MEANS WITH A GOVERNOR TO RAISE THE MAGNET

BACKGROUND OF THE INVENTION

1. Field of the Invention

The present invention relates to a device for measuring the thickness of non-magnetic layers on magnetic substrates by determining the adhesion of a magnet to the substrate.

2. Description of the Prior Art

Devices of this type are used, for example, to determine the thickness of non-magnetic layers such as varnishes, chrome plating, plastic coatings, etc., on an iron support.

In its most simple form, an adhesion meter for reliably measuring the thickness of a layer by the magnetic process consists of a rod-shaped permanent magnet, which can be removed from the non-magnetic layer by means of a spring. The thinner the non-magnetic layer, the greater the adhesive force. This can be measured according to the spring force needed to remove the permanent magnet. This adhesive force can then be read from a scale (Zeitschrift fur Metallkunde, volume 54, 1963, No. 6, page 339 onwards).

A layer thickness measuring device of the above type is disclosed in German Pat. No. 869 125 and it will be described hereinafter in reference to FIG. 1 of the accompanying drawings.

A balance scale balance 2 is pivotably mounted at a point 7. The point 7 preferably forms the center of gravity of the entire rotating system which will be described hereinafter.

The magnet 3, generally a permanent magnet, is mounted on the leading end of the scale of balance 2. A torque can be exerted on the scale balance 2 by means of a spiral spring 5 acting as the measuring spring. The inner end of the spiral spring 5 is secured to the scale balance 2 and the outer end of the spiral spring 5 is attached to a pivotable graduated disk 4 which is also mounted at point 7.

To carry out a measuring operation the magnet 3 is placed on the non-magnetic layer with the spiral spring 5 in the relaxed state. The thickness of the non-magnetic layer will be determined by measuring the distance between the magnetic support and the contact point of the magnet, i.e., the surface of the non-metallic layer. A pressing pin 6 provided on the other end of the scale balance 2 can be raised so as to pivot the scale balance 2 in a counter-clockwise direction and allow the magnet 3 to exit via an opening in the housing 1 and thus adhere to the measurement point.

By pivoting the scale disk 4 in a clockwise direction the spiral spring 5 is stressed until the magnet 3 is suddenly raised from the surface of the non-magnetic layer. Thus, the adhesion of the magnet 3 to the magnetic layer corresponds to a specific tensional force of the spring 5 and thus to a specific angular position of the scale disc 4. As a result, by corresponding calibration of the device it is possible to directly determine the thickness of the magnetic layer from this angular position.

However, a certain amount of practice and experience is required to use this device and thus the measurements obtained generally depend largely on the way in which the device was used. However, this is extremely unfortunate as subjective influences can so affect the measuring operation that the practicability of such a device is rendered questionable.

As a device of this type is not only used by engineers but also by businessmen, representatives, purchasers, etc., operating errors should, as far as possible, be eliminated and objective measurements sought. However, this can only be achieved by simplifying the method of using the device.

Hitherto, the user had to hold the device in one hand and rotate the scale disc 4 with the index finger or thumb of this hand while taking the measurement. However, it is impossible in this way to hold the device completely still and without vibrating the same on the measuring spot. This is absolutely essential if the thickness of the layer is to be accurately determined.

In the case of an accurate measurement the adhesion of the magnet 3 when it is ripped from the non-magnetic layer is equal to the withdrawal force of the spiral spring 5. However, the equilibrium is unsteady and even slight mechanical influences such as vibrations or knocks could cause the magnet 3 to be raised. An excessive layer thickness would then be indicated and it would be impossible to calculate this error as it would depend on influences which could not be controlled.

These errors are especially marked when the device is used in inaccessible places such as on vertical walls in pipes or above the head on ceilings, etc.

Another essential condition for obtaining an accurate measurement is that the user ceases to rotate the scale disk 4 immediately the magnet 3 is raised from the non-magnetic layer. This is made evident by a clicking sound. However, the actual point at which the rotating movement is ceased depends on the reaction time of the user and thus the scale disk 4 is generally turned a little further than the actual measuring point. As a result, the layer thickness measurement is too low.

Another disadvantage of this device consists in that the user has the impression that he has adjusted the measurement himself and thus the measured layer thickness will be considered as a subjective measurement.

SUMMARY OF THE INVENTION

The object of the present invention is therefore to provide a device of the above-described type which obviates the above disadvantages.

It is a specific object to design such a device in which the measuring operation can be carried out automatically, rapidly and accurately without the user influencing the measurement.

The advantages obtained by means of the invention depend largely on the following mode of operation: The device is placed on the measuring point on the surface of the non-magnetic layer. The scale disk is then turned forwards with a finger in the direction of higher layer thicknesses. As a result, the magnet comes into contact with the surface of the non-metallic layer. If the user now releases the scale disk it will be continuously rotated by the drive device in opposition to the tensioning force of the spiral spring in the direction of the zero layer thickness. In the course of this rotation the state of equilibrium will be reached in which the adhesive force of the magnet corresponds to the withdrawal force of the spiral spring. At this point the magnet is raised from the layer. The locking device simultaneously interrupts rotation of the scale disk such that the latter stops and indicates the measurement which is retained until the next measuring operation.

Accordingly, during the actual measuring operation the user need only hold the device on the measuring point, thereby obviating the above-mentioned measurement errors resulting from the reaction time of the user. Moreover, the user does not have the impression that he is able to manipulate the measuring operation and obtain his own subjective measurement. In addition, owing to the fact that the actual measuring operation is not carried out by the user but takes place automatically it is now possible to measure the layer thicknesses of small objects such as screws, balls, spindles, etc., without special holders. All measurements can be taken in a largely vibration-free manner as the user no longer has to rotate the scale disk. Lastly, the actual measuring operation takes only a short time as the scale disk can be operated at high speed.

The drive mechanism can consist of a small electromotor which is switched off by the blocking device when the magnet is raised from the non-magnetic layer, thereby terminating the rotation of the scale disk.

Although either a power line voltage source or a battery is needed to supply the electromotor, the advantage of this type of layer thickness meter is its unrestricted use and ease of application. To eliminate the voltage source the drive device preferably consists of a second spiral spring which is disposed on the distal side of the scale disk with respect to the first spiral spring and which is slightly more powerful than the first spiral spring. In this way the device can be used anywhere without restriction as a power line voltage source or a battery.

When the blocking device acts directly on the scale disk, powerful forces are needed to terminate rotation thereof. In addition, the angle accuracy achieved is relatively low. Accordingly, a gear is preferably coupled to the scale disk to step up its rotational movement by a multiple, for example, 1:50. Only a minimal force is then required to terminate the rotation of the scale disk and the end point of the rotational movement and angular position of the scale disk thereby established can be obtained with great accuracy. This, in turn, means that the measurement corresponds exactly to the layer thickness.

A centrifugal governor is to be mounted on the rapidly moving axis of the gear to enable the scale disk to rotate at a constant rate independently of the spring tension or the r.p.m. of the electromotor.

The gear is also coupled to the scale disk via a free-running mechanism which ensures that the centrifugal governor only rotates when the spiral spring acting as the drive device runs down, i.e., only during the measuring operation and not when the spiral spring is being wound up by means of this scale disk.

When using this type of gear, the rotation of the scale disk during the measuring operation can be interrupted by means of a pawl which is mounted on the end of a rotatable scale balance which bears the magnet at its other end. As the scale balance is pivoted when the magnet is raised, the point at which the adhesive force of the magnet corresponds to the withdrawal force of the first spiral spring can be accurately determined. The pawl preferably engages on the centrifugal governor, thereby blocking the gear, and thus the scale disk, which remains in a specific angular position corresponding to an indicated measurement.

When preparing the measuring operation, the magnet must be placed on the measuring point on the surface of the non-magnetic layer. This is accomplished by a pressing pin which must be pushed into the housing by the user, whereupon the scale balance is pivoted and the magnet adheres to the measuring point.

A pressing device is therefore preferably provided which simultaneously places the magnet on the measuring point when the scale disk is tensioned. This further simplifies use of the device for the measuring operation, namely the operations of adjusting the scale disk and pushing out the magnet.

This pressing device can consist of a circular spring which is adjacent to the scale disk and when the scale disk is rotated to tension the second spiral spring, its contact with the same causes it to be simultaneously displaced by the resulting friction, thereby pivoting the magnet, for example, by means of the scale balance, and placing it on the measuring point. When the scale disk is rotated in the other direction, the annular spring coils up so that only minimal frictional forces are produced and virtually unhindered rotation of the scale disk can take place during the measuring operation.

Other objects, features and advantages of the present invention will be made apparent in the course of the following description of various embodiments thereof provided with reference to the accompanying drawings.

BRIEF DESCRIPTION OF THE DRAWINGS

FIG. 3 is a section through the scale disk and scale balance of the device according to the invention, and FIG. 4 is an outside view of the device according to the invention.

DETAILED DESCRIPTION OF THE PREFERRED EMBODIMENT

Figure 1:
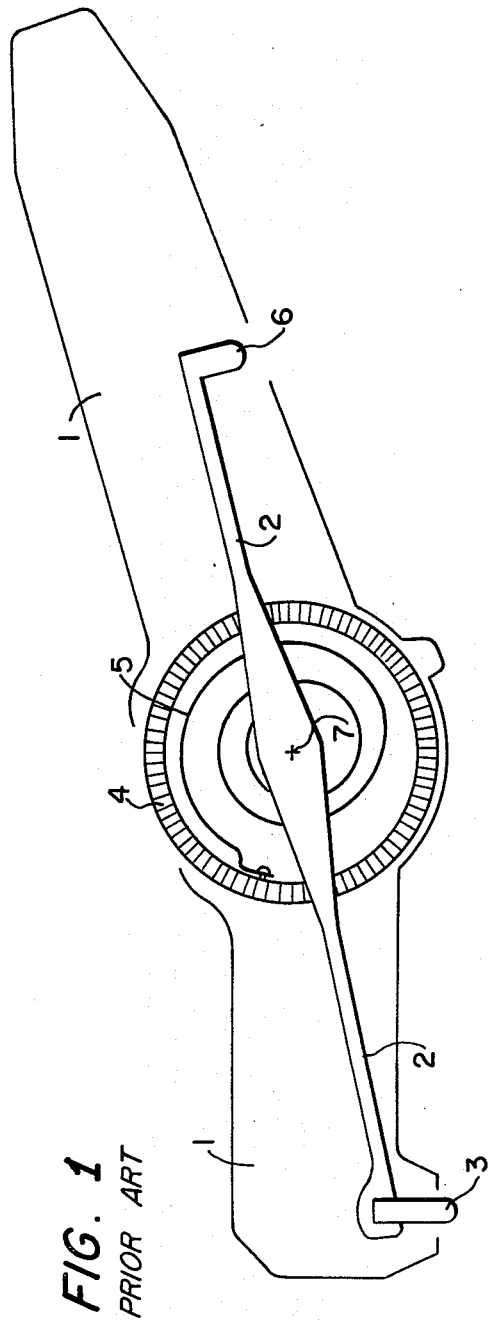
FIG. 1 is a sectional view through a prior art device for measuring layer thickness.

Referring to the drawings, a balanced scale balance 2 is rotatably mounted at a point 7 in a housing 1. The magnet 3 is mounted at the other end of the scale balance 2. The weight of this magnet 3 can be counterbalanced by a counterweight.

A torque is exerted on the scale balance 2 by means of the spiral spring 5 serving as the measuring spring (see FIG. 3). The inner end of the spiral spring 5 is secured to the scale balance 2 and the outer end of the spiral spring 5 is attached to the scale disk 4 which is also rotatably mounted at the point 7.

The scale disk 4 consists of a circular plate 4a which is provided with edges 4b projecting at right angles thereto at both sides on its periphery. The spiral spring 5 is disposed between the edges 4b on one side of the plate 4a.

The second spiral spring 14 serving as the drive device is located between the edges 4b on the opposite side of the plate 4a. The second spiral spring 14 is attached by one end to the housing 1 and by the other end to an edge 4b of the scale disk 4. The second spiral spring 14 has a slightly greater spring force than the first spiral spring 5 and its torque counteracts the tension of the spiral spring 5 serving as the measuring spring.

The spiral spring 14 thus prestresses the scale disk 4 for rotation in the direction of the layer thickness zero such that the first spiral spring 5 can be fully tensioned by the same.

The first wheel of a gear 8 consisting of a plurality of wheels abuts against the edge 4b of the scale disk 4 such that the rotational movement of the scale disk 4 is stepped up by a multiple, for example, 1:50. The movement energy can either be transmitted by friction wheels or toothed wheels.

A centrifugal governor 9 is mounted on the rapidly rotating axis 8a of the last gear wheel 8 such that the scale disk 4 rotates at a constant rate independently of the tension of the second spiral spring 14. The centrifugal governor 9 consists of a bent leaf spring 9a mounted on the axis 8a. Balls 9b are located at the ends of the leaf spring 9a. When the rate of rotation of the rapidly rotating axis 8a is increased, the leaf spring 9a is bent outwards such that the balls 9b come into contact with the last gear wheel 8 and brake the latter. With a low rotation rate of the axis 8a, the balls 9b are not in contact with the last gear wheel 8, allowing the latter to rotate freely.

The centrifugal controlling action can be adjusted by appropriate selection of the tension of the leaf spring 9a.

The gear 8 is coupled to the scale disk 4 via a free-running mechanism 11 and thus the centrifugal governor 9 only rotates when the second spiral spring 14 acting as the drive device runs down. Accordingly, the centrifugal governor 9 only rotates during the measuring operation when the scale disk 4 is rapidly rotated and not when the second spiral spring 14 is wound up by means of the scale disk 4.

The free running mechanism 11 consists of spiral spring which is pushed over an axis and one end of which is connected to a hollow shaft enclosing the spiral spring.

Figure 2:
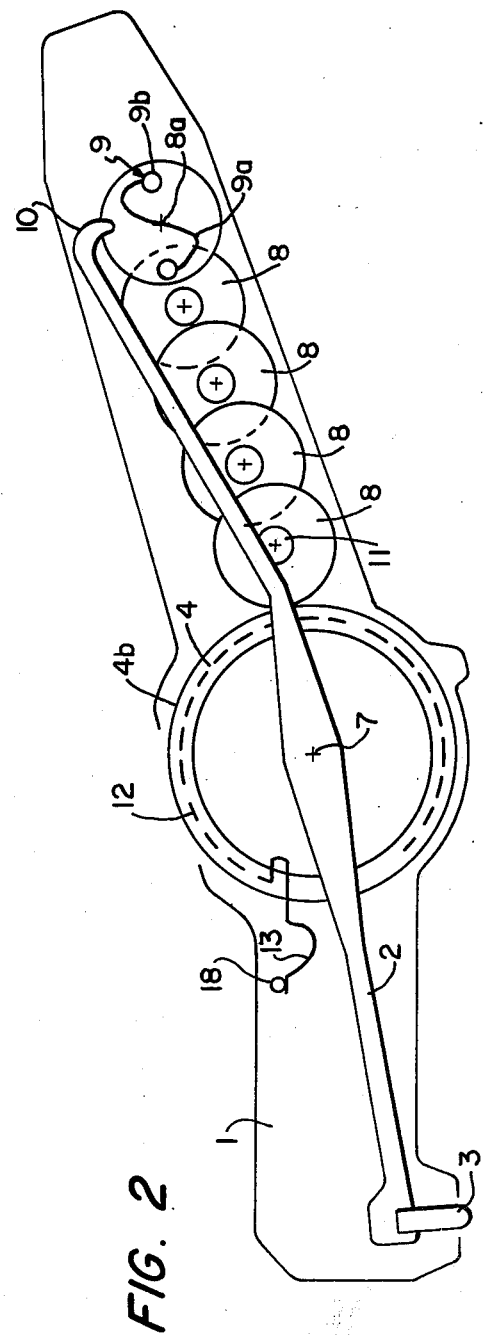
FIG. 2 is a sectional view through a device according to the present invention.

When the second spiral spring 4 serving as the drive device is run down, the scale disk 4 rotates in a counter-clockwise direction as shown in FIG. 2, such that the outer hollow shaft of the free running gear 11 is simultaneously rotated. As a result, the spiral spring of the free running mechanism is tightened on the axis and thus the gear 8 and also the centrifugal governor 9 are also rotated.

When the scale disk 4 is rotated in a clockwise direction to tension the spiral spring 14, the hollow shaft of the free running mechanism 11 is also rotated in the opposite direction such that the spiral spring is unwound from the axis. As a result, this rotation of the scale disk 4 is not transmitted to the gear 8.

The scale balance 2 comprises a pawl 10 on its opposite end to the magnet 3. This pawl 10 is formed by the bent end of the scale balance 2.

The length of the trailing arm of the scale balance 2 on which the pawl 10 is located is such that the pawl 10 is adapted to engage in the centrifugal governor 9 and thus can block the gear 8 and also the rotation of the scale disk 4. The pawl 10 thus operates as a blocking device which interrupts the rotation of the scale disk when the magnet 3 is raised from the non-magnetic layer.

In the edge 4b of the scale disk 4, in which the second spiral spring 14 is disposed, is a groove 4c in which an annular spring 12 is disposed. The annular spring 12 consists of a spring wire comprising virtually an entire winding.

One end of the spring wire projects from the scale disk 4 through the edge 4b forming an arm 13. The other end of the spring wire remains free on the inner surface of the groove 4c.

The mode of operation of the device will now be described in detail.

When the scale disk 4 shown in FIG. 2 is rotated in a counter-clockwise direction the second spiral spring 14 which serves as a drive device and which is connected to the scale disk 4 is tensioned. The edge 4b simultaneously displaces the annular spring 12 disposed in the groove 4c such that the arm 13 strikes against the upper side of the scale balance 2, as shown in FIG. 2, and pushes down the left arm of the scale balance 2 comprising the magnet 3. As a result, the magnet 3 passes through the opening in the housing 1 and can be placed on the measuring point. During this rotating movement the annular spring 12 is pressed increasingly further apart and remains with increased outwardly directed pressure in the groove 4c. As a result, a relatively powerful frictional force is produced between the annular spring and the groove 4c, such that a relatively powerful torque can be transmitted to the scale balance 2 via the arm 13. The magnitude of this torque can be adjusted by means of the spring tension with which the annular spring 12 is situated in the groove 4c.

As the free running mechanism 11 is connected between the scale disk 4 and the gear 8, the centrifugal governor 9 is not rotated during this rotation of the scale disk 4 in a counterclockwise direction.

If the user now releases the scale disk 4, it is driven by the energy stored in the second spiral spring 14 and rotates very rapidly in the clockwise direction, the first spiral spring 5 serving as a measuring spring being simultaneously tensioned. The gear 8 is now driven via the free running mechanism 11 such that the last gear wheel rotates at a rate which is adjusted by the centrifugal governor 9.

This rotation of the scale disk 4 during the measuring operation is not hindered by the annular spring 12 serving as a pressing device as the annular spring 12 is only displaced at the beginning of this rotation until the arm 13 strikes against the stop 18. The annular spring 12 is then compressed toward the middle of the scale disk 4 until only its other end slides in the inner face of the groove 4c. As a result, there is now only a very slight frictional force between the annular spring 12 and the groove 4c such that the rotation of the scale disk 4 is virtually unhindered during the measuring operation. The arm 13 is also unable to prevent a pivoting movement of the left arm of the scale balance 2 in the clockwise direction (see FIG. 2).

When the adhesive force of the magnet 3 on the measuring point is equal to the withdrawal force of the first spiral spring 5, the magnet is suddenly released from the measuring point and moves rapidly upwards. In the view shown in FIG. 2 the scale balance 2 is therefore pivoted in the clockwise direction about the axis 7. As a result, the pawl 10 disposed on the trailing end of the scale balance 2 engages in the centrifugal governor 9, whereupon the gear 8 and thus the scale disk 4 are stopped in an accurately defined angular position. After corresponding calibration of the device and, more particularly, of the scale on the scale disk 4, this angular value corresponds to a specific thickness of the non-magnetic layer which can now be read off the scale disk 4.

Up to this point the description of the device has related to a measuring operation in which the device could be placed on the surface of the non-magnetic layer. However, this device can also be used as a bench model by mounting a hinged stay bar 17 on the housing 1. The device can then be used as shown in FIG. 4 where it is supported on a surface by means of the bar 17 and by its other end. In this position, the magnet 3 projects upwards.

The thicknesses of non-magnetic layers of small objects such as screws, balls, axes, etc., can now be measured without a special holding device. The small objects are arranged above the housing opening in which the magnet 3 is located by means of an attachable plate 16. The scale disk 4 is then rotated for a short distance in the direction of increased layer thicknesses such that the magnet 3 leaves the opening and adheres to the article to be measured. The spiral spring 14 is simultaneously tensioned. When the scale disk is now released the above-mentioned measuring operation takes place, i.e., the scale disk 4 rotates automatically to the measurement value and stops. The measurement can then be read.

Although a spiral spring 14 was used as the drive device in the above-described embodiment, the scale disk 4 can also be driven by a different type of drive unit, for example, an electromotor. The blocking device is then preferably so designed that when the magnet 3 is raised from the non-magnetic layer, a switch is tripped which disconnects the electromotor, for example, by interrupting the current supply.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. In a device for measuring the thickness of non-magnetic layers on magnetic substrates by determining the adhesion of a magnet in contact with the layer, the device comprising a housing, a scale balance carrying the magnet at one end thereof the scale balance being mounted rotatably about an axis within said housing, a manually rotatably scale disk and a first spiral spring means connected to the scale balance at one end and to the scale disk at the other end such that rotation of the scale disk causes rotation of the scale balance the scale disk and the first spiral spring means being coaxial with the scale balance axis, the improvement comprising drive means for rotating said scale disk including a second spiral spring means having one end attached to the housing and the other end attached to the scale disk the second spiral spring means being coaxial with the scale balance axis, the spring tension of the second spiral spring means being slightly greater than that of the first spiral spring means and counteracts the first spiral spring means, a governor means for controlling the rotational speed of the scale disk and a pawl means formed on the scale balance, said pawl means engaging the drive means thereby blocking the further rotation of the scale disk upon raising the magnet from the non-magnetic layer.

2. A device according to claim 1, including a gear means coupling the scale disk to the governor, wherein the governor is a centrifugal governor.

3. A device as claimed in claim 1, wherein the pawl engages the governor when the magnet is raised.

4. A device as claimed in claim 1, including a pressing means for the magnet, the pressing means applying a force to the magnet when the scale disk is rotated, in preparation for the measuring operation.

5. A device as claimed in claim 4, wherein the pressing means comprises an annular spring which is in contact with the inner face of the scale disk and the end of which projects from the scale disk and engages the scale balance.

6. A device as claimed in claim 5, including an abutment wherein during the measuring operation, the free end of the annular spring strikes against an abutment.

7. A device as claimed in claim 1 wherein the magnet is a permanent magnet.

8. A device as claimed in claim 1 including a support bar pivotally mounted on the housing for supporting the device on a surface.

9. A device as claimed in claim 1 including a plate means for holding small objects, said plate means attached to said housing and being positioned adjacent the magnet wherein the plate means supports an object when the thickness of a non-magnetic layer thereon is being measured.

* * * * *